(12) United States Patent
Blanchard

(10) Patent No.: US 6,186,916 B1
(45) Date of Patent: Feb. 13, 2001

(54) RELAY PULLEY AND ITS ENDLESS TRANSMISSION

(75) Inventor: Robert Blanchard, Le Boupere (FR)

(73) Assignee: France Reducteurs, Les Herbiers (FR)

( * ) Notice: Under 35 U.S.C. 154(b), the term of this patent shall be extended for 0 days.

(21) Appl. No.: 09/326,706

(22) Filed: Jun. 7, 1999

(30) Foreign Application Priority Data

May 5, 1999 (FR) .................................................. 99 05703

(51) Int. Cl.[7] ........................... F16H 59/00; F16H 61/00; F16H 63/00
(52) U.S. Cl. ..................................... 474/14; 474/8; 474/84
(58) Field of Search ..................... 474/8, 9, 10, 14, 474/19, 84, 85

(56) References Cited

U.S. PATENT DOCUMENTS

| | | | |
|---|---|---|---|
| 3,786,688 | * | 1/1974 | Svenson ........................ 74/230.17 M |
| 4,270,906 | * | 6/1981 | Kraft et al. ........................... 474/135 |
| 4,962,636 | * | 10/1990 | Sampei et al. ......................... 56/17.1 |
| 5,403,240 | * | 4/1995 | Smith et al. ............................. 474/8 |

FOREIGN PATENT DOCUMENTS 60-048032 * 8/1983 (JP) .

* cited by examiner

*Primary Examiner*—Charles A Marmor
*Assistant Examiner*—Tisha D. Waddell
(74) *Attorney, Agent, or Firm*—Young & Thompson

(57) ABSTRACT

A relay pulley (1) for endless power transmission between a drive pulley (2) and a driven pulley (3). The relay pulley (1) comprises a rotatable hub (6) carrying, between two external fixed plates (7A, 7B), at least one member (8) movable axially on the hub (6) to delimit with the fixed plates (7A, 7B) two parallel grooves (9A, 9B) of variable dimension adapted to receive respectively a belt (4, 5) of a first (T1) or second (T2) endless belt transmission. The movable member (8) comprises at least two hollow plates (8A, 8B) mounted on the hub (6), which include facing bearing surfaces (10A, 10B) in sliding contact. The bearing surfaces (10A, 10B) are arranged to permit the approach or respectively the movement apart of the movable plates (8A, 8B).

11 Claims, 5 Drawing Sheets

RELAY PULLEY AND ITS ENDLESS TRANSMISSION

FIELD OF THE INVENTION

The present invention relates to a pulley of a variable speed transmission of the V pulley and trapezoidal belt type, as well as the endless transmission incorporating such a pulley.

It relates more particularly to a relay pulley for the endless transmission of power at variable speed, between a drive pulley of a first endless transmission with a trapezoidal belt and a driven pulley of a second endless transmission with a trapezoidal belt, said relay pulley being constituted by a rotatable hub carrying, between two fixed external plates, at least one axially movable member on said hub to delimit, with the fixed plates, two parallel grooves of variable dimension adapted to receive respectively a belt of the first or respectively of the second endless belt transmission.

BACKGROUND OF THE INVENTION

The principle of operation of such a transmission is well known. Thus, the V grooves of the relay pulley are of variable size because of the displacement of the movable member axially on the hub of the relay pulley. Each relative displacement of the drive, driven and relay pulleys relative to each other gives rise to an external or internal radial displacement of the belt of one of the transmissions in one of the grooves of the relay pulley and substantially simultaneously of a directly proportional radial displacement in a reverse direction of the belt of the other transmission in the other groove under the action of the displacement of said movable member. This variation of the diameter of engagement of the belts in the grooves of the relay pulley generates the desired speed change.

The principal drawbacks encountered in this type of transmission are high wear of the belts and of the assembly of members constituting the transmission, as well as large power loss by friction such that the overall output of the transmission is mediocre. To permit a reduction in wear of the constituent members of this transmission and correspondingly to increase the output of the transmission, it is necessary that the belts of the two transmissions be slightly stretched when the engine stops and that their tension increases proportionately to the increase of the couple transmitted. Because of this problem, a certain number of manufacturers have designed tensioning devices for the belt at the moment of starting the transmission. However, none of these devices is satisfactory to the extent that all these devices include fragile parts, in particular springs, as again shown in U.S. Pat. No. 4,176,560, or tensioning rollers.

SUMMARY OF THE INVENTION

A first object of the present invention is to provide a relay pulley for a transmission of the recited type, whose design permits tension and automatic loosening of the belts of each of the transmissions as a function of the transmitted couple, including in the absence of resilient return members, such as springs, or tensioning elements, such as rollers, and without reducing the speed range of said transmission.

Another object of the present invention is to provide a relay pulley whose design permits, despite its simplicity, automatic accommodation of wear of the pulley of each transmission and quasi-simultaneous adjustment of the tension of the two belts.

Another object of the present invention is to provide a relay pulley whose design permits making it of pieces of synthetic material without undergoing deformation of the constituent elements of said pulley with time.

Another object of the present invention is to provide an endless variable speed transmission whose design permits obtaining a compact, reliable, certain transmission and at low cost, whose overall output is improved.

To this end, the invention has for its object a relay pulley for the endless power transmission with variable speed between a drive pulley and a first endless transmission with a belt and a driven pulley of a second endless transmission with a belt, said relay pulley being constituted by a rotatable hub carrying, between two external plates fixed to said hub, at least one member movable axially on said hub to delimit, with the axially fixed plates, two parallel grooves of variable dimension adapted to receive respectively a belt of the first or respectively of the second endless belt transmission, characterized in that the axially movable members constituted by at least two hollow plates mounted on the rotatable hub, these plates confronting bearing surfaces in sliding contact, said bearing surfaces being arranged to permit, during angular displacement of at least one of the blades, as a function of the couple transmitted by the belt from at least one of the transmissions, the approach or respectively the spacing of the confronting movable plates so as to ensure, by co-action with the fixed external plates, an automatic tensioning or relaxing of the belts of the first and second transmissions.

In accordance with the invention, the possibility of replacement of fragile members such as springs or tensioning rollers by simple bearing surfaces permits obtaining an automatic tensioning or respectively relaxation of the belts of each of the transmissions, this adjustment taking place instantaneously and proportionally to the couple transmitted, such that the belts have high tension only when this is necessary for the good operation of the transmission. As a result, there is an absence of wear of the constituent members of the relay pulley. But conversely, this design permits, because of a progressive tensioning of the belts proportionally to the couple transmitted, curing or retarding the play due to wear of any one of the belts.

The invention also has for its object an endless power transmission with variable speed, between a drive pulley, a relay pulley and a driven pulley, characterized in that the relay pulley of the type recited above and the driven pulley are disposed in a transmission housing to form a monobloc assembly, the relay pulley being connected to the transmission housing by a control member of the position of the hub of the relay pulley.

BRIEF DESCRIPTION OF THE DRAWINGS

The invention will be better understood from a reading of the following description of examples of embodiments, with reference to the accompanying drawings, in which.

DETAILED DESCRIPTION OF THE INVENTION

Figure 1:
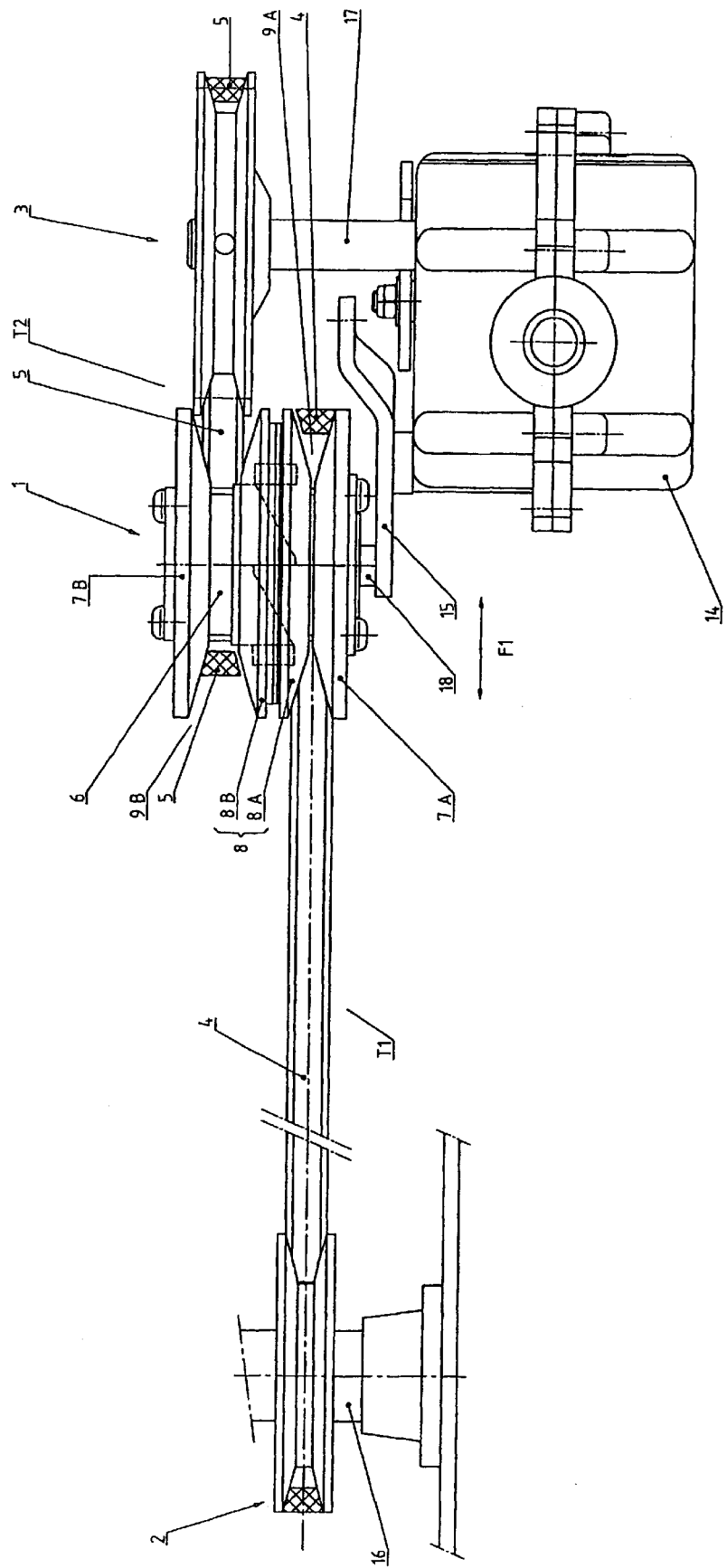
FIG. 1 is a cross-sectional view of a relay pulley incorporated in an endless transmission with variable speed in the closely spaced condition of the constituent plates of the movable member of said relay pulley.
Figure 2:
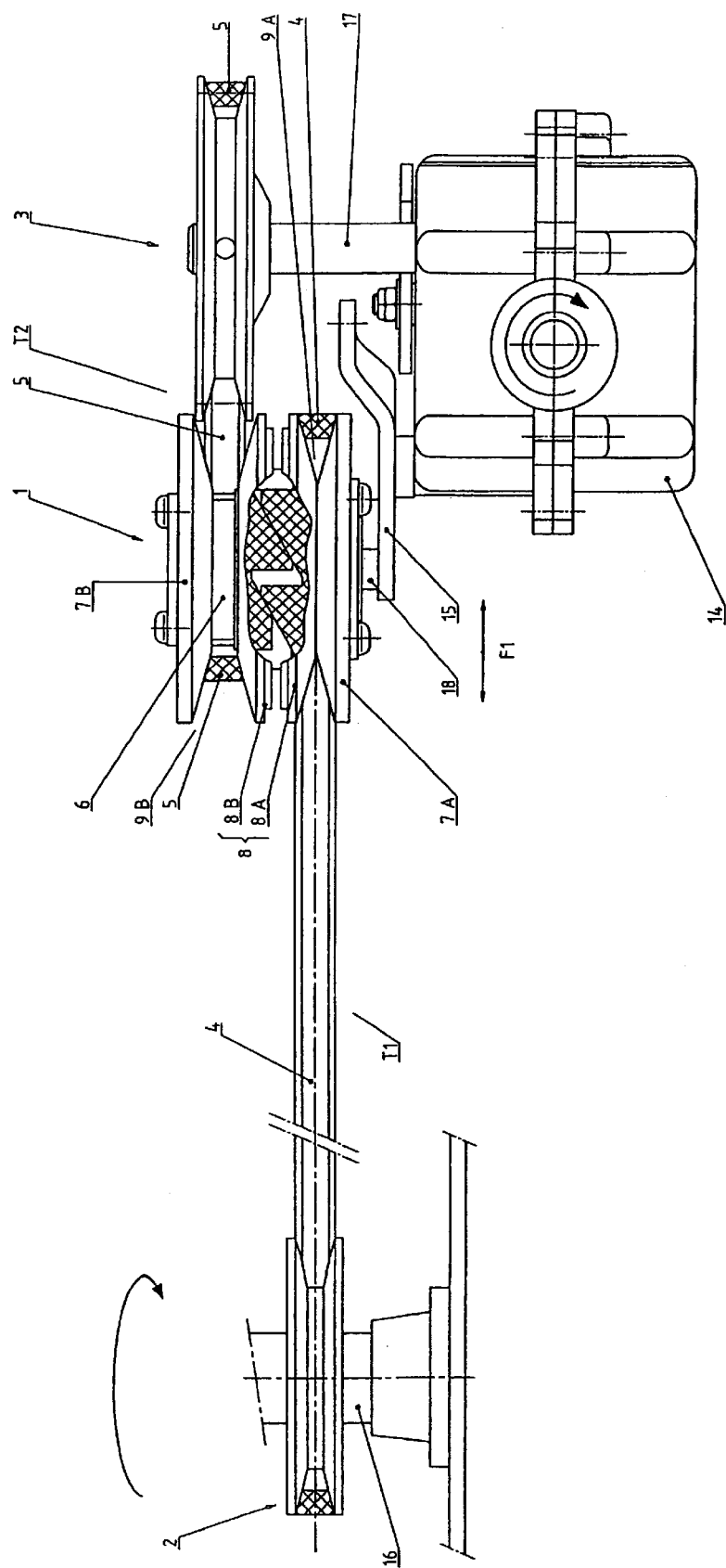
FIG. 2 is a view in cross-section of a relay pulley incorporated in an endless power transmission of variable speed in the spaced-apart condition of the plates constituting the movable member of said relay pulley, whose condition corresponds to a predetermined tension in the belts of each of the transmissions.

The relay pulley 1 according to the invention is adapted to service a relay between a first endless belt transmission T1 and a second endless belt transmission T2. The first endless transmission T1 is a transmission with a trapezoidal belt 4 between a drive pulley 2 and the relay pulley 1. By drive pulley 2 is meant a pulley mounted on a motor shaft 16. The second endless transmission T2 is also a transmission with a trapezoidal belt 5 disposed between the relay pulley 1 and a so-called driven pulley 3 carried by a shaft 17 constituting for example the input shaft of a reducer disposed within a housing 14, the output shaft of this reducer housing coming for example into engagement with a wheel shaft (not shown) of a tractor engine. As mentioned above, the belts 4, 5 used in the transmissions T1 and T2 are trapezoidal belts known per se. The drive pulley 2 and driven pulley 3 as well as the relay pulley 1 comprise, for the reception of the belts 4, 5, grooves 9A, 9B of trapezoidal cross-section. To provide these grooves 9A, 9B, the relay pulley 1 is constituted by a rotatable hub carrying, between two fixed external plates 7A, 7B fixed to the hub 6, at least one member 8 movable axially to delimit, with the fixed plates 7A, 7B, two grooves 9A, 9B axially offset on said hub 6 or else known as parallel. Grooves 9A, 9B are of variable dimension because of the variation in the spacing of the movable member 8 relative to each fixed plate 7A, 7B. The facing surfaces of the fixed external plates 7A, 7B have the shape of truncated conical disks. The axially movable member 8 is itself constituted also by at least two hollow plates 8A, 8B mounted on the rotatable hub 6. Each surface of these movable plates 8A, 8B facing an external fixed plate 7A, 7B also has the shape of a truncated conical disk to delimit with a fixed external plate 7A, 7B a throat 9A, 9B of V shape.

The plates 8A, 8B, movable at least axially on the rotatable hub 6 of the relay pulley 1, comprise facing bearing surfaces 10A, 10B in sliding contact with each other. The bearing surfaces 10A, 10B, disposed circularly about the hub 6 on the internal surface of each movable plate 8A, 8B, are arranged to permit, during angular displacement of at least one (8B) of the plates 8A, 8B, as a function of the couple transmitted by the belt 4, 5 of one of the transmissions T1, T2, the approach or respectively the spacing of the movable facing plates 8A, 8B, this displacement giving rise, in cooperation with the fixed external plates 7A, 7B, to an automatic tension or relaxation of the belts 4, 5 of the first and second transmission T1, T2.

Figure 3:
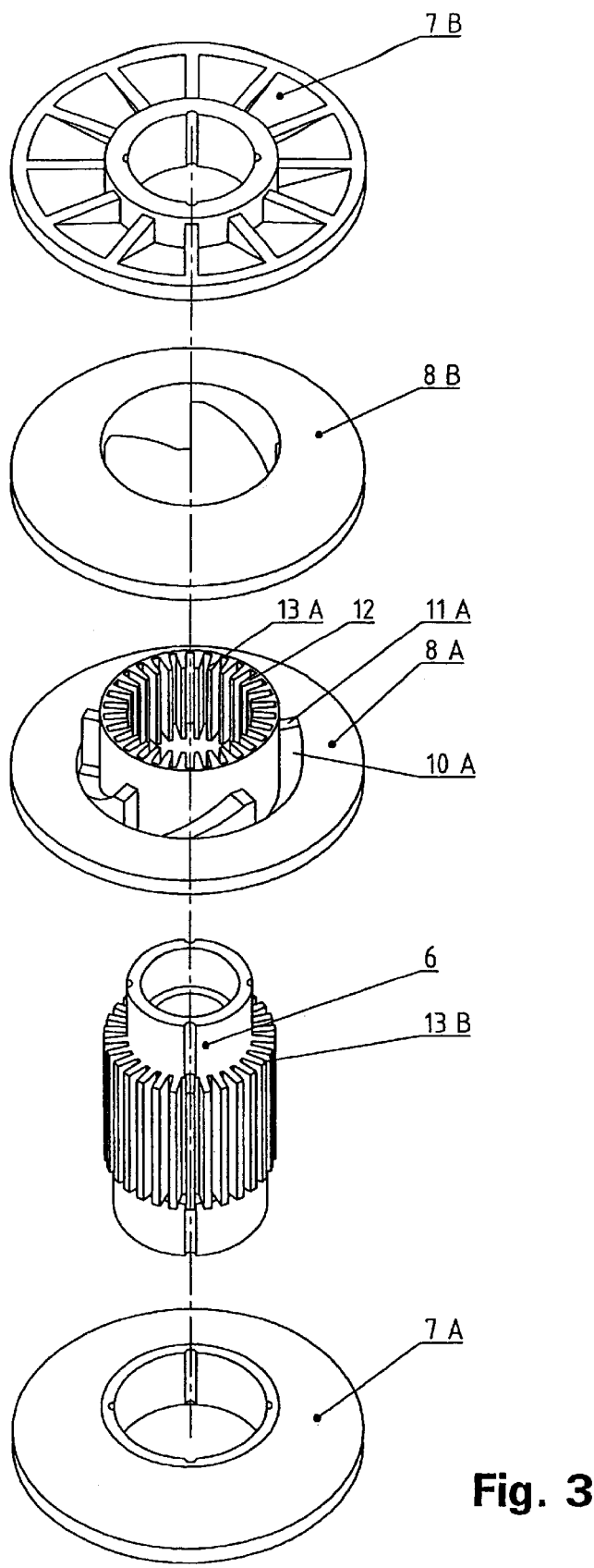
FIG. 3 is a perspective view in exploded condition of the constituent elements of a relay pulley.
Figure 4:
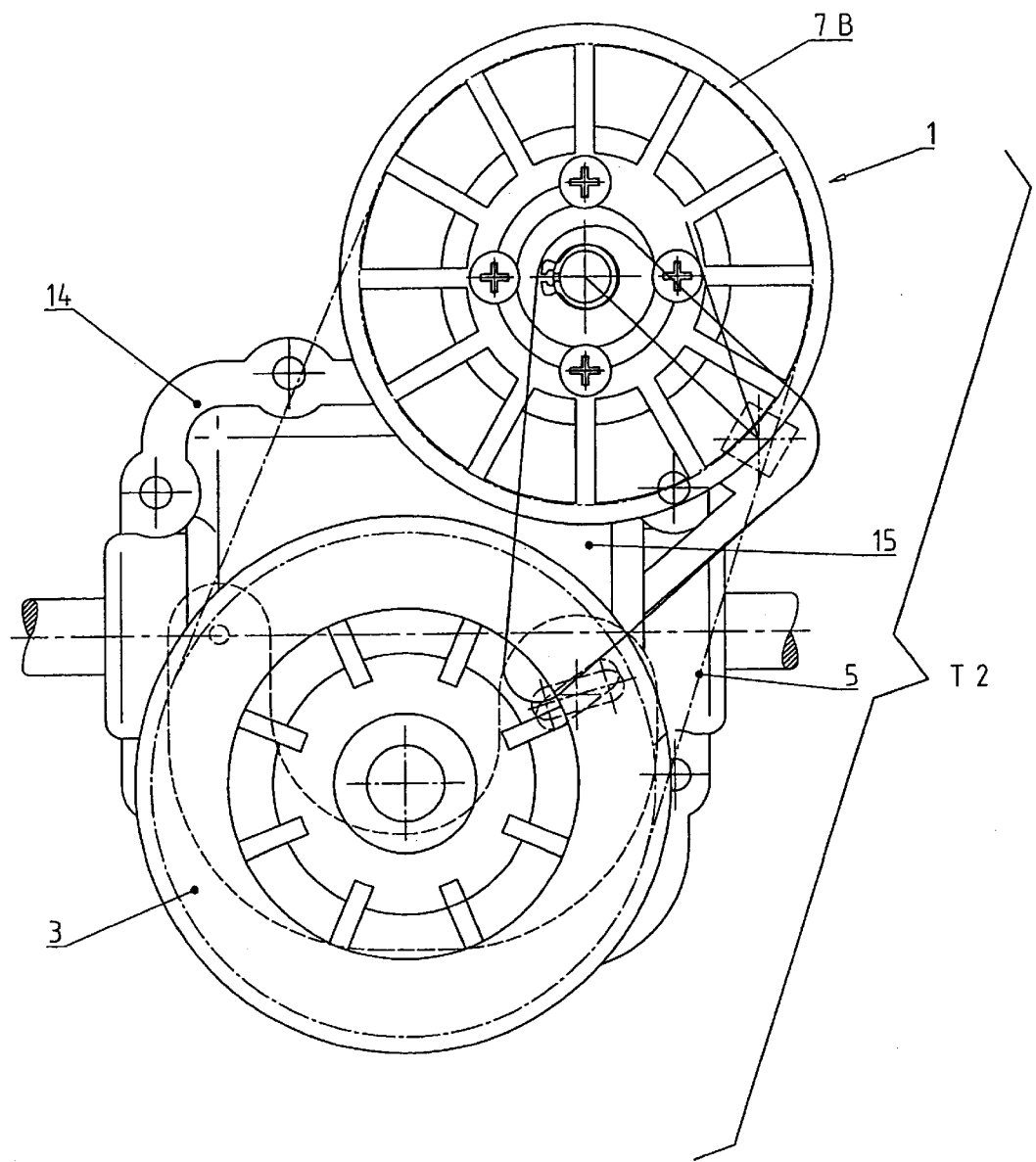
FIG. 4 shows a view from above while the transmission between the relay pulley and the driven pulley mounted on the input shaft of a reducer.

In the illustrated examples, the plate 8B is movable axially and in rotation on the rotatable hub 6 of the relay pulley 1, whilst the other plate 8A is movable only axially. However, an equivalent solution (not shown) would consist in utilizing two plates movable axially and in rotation on the hub 6. As shown in FIG. 3, the facing bearing surfaces 10A, 10B of the movable plates 8A, 8B constitute a cam formed of at least two inclined ramps, in sliding contact, one of the ramps 10A being secured to one of the at least axially movable plates 8A, the other ramp 10B being secured to the axially and rotatably movable plate 8B. These circular inclined ramps 10A and 10B convert the movement of rotation of at least one of the plates 8A or 8B, in this case the plate 8B, about the hub 6, to a translatory movement of the plates 8A and 8B on the hub 6.

These bearing surfaces can have a large number of shapes. Preferably, the confronting bearing surfaces 10A, 10B of the movable plates 8A, 8B are constituted by a plurality of inclined ramps with radial ridges 11A, 11B, these ramps 10A, 10B of the movable plates 8A, 8B respectively interpenetrating to be constantly in engagement with each other, a relative angular movement of any one of the plates under the influence of the transmitted couple, giving rise either to the approach or to the farther spacing of said plates 8A, 8B.

Figure 5:
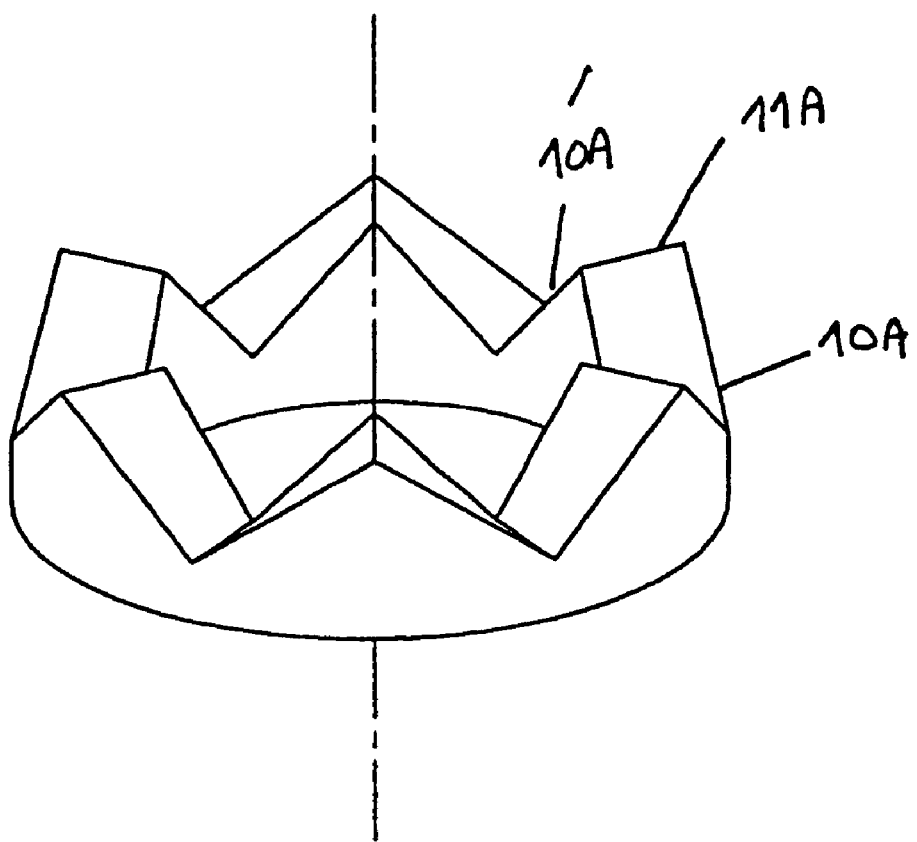
FIG. 5 is a schematic view from above of another embodiment of the bearing surfaces of a plate of the movable member of the relay pulley to render the relay pulley reversible.

To permit operation of this relay pulley 1 in a first direction of rotation of the endless transmission belts 4, 5 or a second direction of rotation of the endless transmission belts 4, 5, the circular inclined ramps of each plate 8A or 8B are preferably in the shape of profile projections 10A, 10'A symmetrically about the radial ridge 11A as shown in FIG. 5. There is thus obtained a movement apart or together of the plates independently of the direction of rotation of these belts 4, 5.

Preferably, and to reduce the size of the assembly, the bearing surfaces 10A, 10B forming ramps for the movable plates 8A, 8B are partially disposed within the thickness of the plates 8A, 8B. The slope of the inclined ramps of each plate 8A, 8B is determined empirically or calculated particularly as a function of the mean diameter of the circle on which are disposed the ramps, of the coefficient of friction of the materials of the ramps, of the maximum couple to be transmitted, of the rolling diameter of the belts, etc. By way of example, with a mean diameter of the circle on which are located said ramps, of the order of 50 mm, and a couple of 3 to 4 N/m, the slope of each inclined ramp is comprised within the range 20–24 degrees, preferably about 22 degrees. This angular value of the slope avoids any wedging of the plates 8A, 8B which constitute the movable member 8 during relatively displacement of this latter. Moreover, in the illustrated embodiments, one of the plates, namely the plate 8A that is movable only axially, has a hollow hub 12, coaxial to the hub 6 of relay pulley 1 to serve as a support for the associated facing movable plate 8B, this plate 8B being movable axially and in rotation. However, another embodiment of the invention could be imagined, each movable plate 8A, 8B being, in this case, directly carried by or in contact with the hub 6 of the relay pulley 1. This hub 6 of the relay pulley 1 is moreover threaded on a carrying shaft 18 on which it is mounted freely in rotation, this carrying shaft 18 being controlled in displacement by means of a manipulating member 15 to permit displacement of the hub of the relay pulley 1 parallel to itself so as to obtain, in a manner known per se, in cooperation with the movable member 8, the function of speed change.

Preferably, the rotatable hub 6 of the relay pulley 1 and one (8A) of the plates 8A, 8B of the member 8 axially movable on the hub 6, are secured in rotation by means of channels 13A, 13B provided respectively in the external periphery of the hub 6 and the internal periphery of the central hollow movable plate 8A. Thanks to the design of this rotatable hub which has the shape of a channelled shaft, the bearing surface between plate 8A and hub 6 is increased and the radial force exerted by the plate 8A on the hub 6 is reduced. Because of this, all risk of wedging of the plate upon axial displacement is prevented despite reduced size of the plate.

Preferably, the assembly of the plates 7A, 7B, 8A, 8B of the relay pulley 1 and the support hub 6 for said plates, are made entirely of synthetic material. The choice of synthetic materials permits overcoming any risk of corrosion or wear with time. Because of the design of the movable member 8, any risk of deformation of the constituent elements of the relay pulley under the influence of force over a period of time, is avoided. Moreover, the reduction of losses by friction, because of the design of the movable member 8, increases the overall output of the transmission.

The principle of operation of such a transmission is extremely simple. It will be described hereafter. When the motor shaft 16 is driven in rotation, the power of the shaft 16 is transmitted by means of the transmission T1 to the relay 1 which, itself, retransmits by means of the transmission T2 this power to the input shaft 17 of the reducer which is engaged with the output shaft of the reducer to permit for example the drive of a tractor engine. When it is desired to vary the transmitted speed of the driving pulley 2 to the driven pulley 3 carried by the input shaft 17 of the reducer, there is displaced, by means of a control member 15 and according to one or the other of the directions of the arrow F1, the carrying axle 18 on which the hub 6 of the relay pulley 1 is freely mounted in rotation. If it is desired for example to reduce the speed transmitted to the output shaft of the reducer, the carrying axle 18 of the relay pulley will be displaced to the left in FIG. 1. The intermediate plate 8A tends to descend or to come toward the plate 7A with which it delimits the groove 9A such that the diameter of rolling of the first belt 4 increases. The speed of rotation of the hub 6 of the relay 1 is thus correspondingly reduced, because of the reduction of the plate 8A. Conversely, upon acceleration, generated for example by the displacement of the carrying axle 18 of the relay pulley I to the right in the direction of arrow F1 in FIG. 1, the belt 4 of T1 tends to penetrate more deeply into the groove of the V delimited by the plates 7A and 8A and the speed of rotation of the hub 6 increases. As a result, there is a tendency for the plate 8A to become separated from the fixed plate 7A while driving in its displacement the plate 8B. The plate 8B thus forms with the plate 7B a groove 9B of greater rolling diameter. Similarly, the increase of the tension of the belt 5 of the transmission 2 has for its effect to drive in rotation the movable plate 8B. Because of the obliquity of the bearing surfaces 10A, 10B with respect to the plates 8A and 8B, the movable plate 8B is driven such that it moves away from the plate 8A and gives rise, by reaction with the belt 5, to an axial displacement of the plate 8A in the direction of approach of the plate 7A, also increasing the tension of the belt 4. The static equilibrium of the movable plates 8A and 8B is reached when the forces tending to space apart the movable plates 8A, 8B cancel those which tend to cause them to approach the fixed plates 7A, 7B with which they respectively form a groove 9A, 9B. The principal advantage of such a relay pulley 1 is that the displacement of this equilibrium point is a function of the couple transmitted. If the couple increases, the pressure of the plates of the pulley on the disks of the belts increases and the adherence of these latter equally increases, so that they do not slide on the sides of the plates. The greater the tension exerted by the belts 4, 5 on the movable plates 8A, 8B, the greater the movable plates 8A, 8B tend to move apart from each other, which is necessary to obtain optimum functioning of the assembly of the transmission. Obviously, the plates 8A, 8B tend to return to their initial position corresponding to a close position as soon as the force exerted by the belts 4, 5 decreases on these plates. Thanks to the fact that the force exerted on the plates 8A, 8B is not permanent but on the contrary increases with the transmitted couple, it will be seen that, even after several hours of use of the transmission, the movable plates 8A, 8B of the transmission have undergone no permanent deformation. Moreover, the output of such a transmission is increased because the losses from friction are low when the couple transmitted by the transmission is low. These frictional losses increase proportionally to the transmitted couple. Obviously, the phenomena of belt tension described above upon acceleration are identical in the case of a reduction of speed of rotation of the hub of the relay pulley.

What is claimed is:

1. A relay pulley for the endless transmission of power at variable speed between a drive pulley of a first endless transmission with a belt, and a driven pulley of a second endless transmission with a belt, the relay pulley comprising a rotatable hub carrying, between two external plates fixed to said hub, at least one member axially movable on said hub to delimit, with the axially fixed plates two parallel grooves of variable dimension adapted to receive respectively a belt of the first or respectively the second endless belt transmission;

wherein the axially movable member comprises at least two hollow movable plates mounted on the rotatable hub; said movable plates comprising facing bearing surfaces in sliding contact with each other; said bearing surfaces being structured and arranged to move axially towards or away from one another upon angular displacement of at least one of the movable plates, as a function of a couple transmitted by the belt from at least one of the transmissions, so as to ensure, by co-action with the external fixed plates an automatic tensioning or a relaxing of the belts of the first and second transmissions.

2. The relay pulley according to claim 1, wherein the facing bearing surfaces comprise a cam formed of at least two inclined ramps, in sliding contact, one of the ramps being secured to one of the movable plates which is movable at least axially, the other ramp being secured to the other movable plate which is movable axially and in rotation.

3. The relay pulley according to claim 1, wherein the facing bearing surfaces comprise a plurality of inclined ramps with radial ridges, said ramps of the respective movable plates interpenetrating to be continuously in engagement with each other, at a relative angular movement of any one of the movable plates arising from the transmitted couple causing said movable plates to move axially towards one another or away from one another.

4. The relay pulley according to claim 3, wherein the inclined ramps are present in the form of protrusions with a symmetrical profile on either side of a radial ridge to obtain a spacing or an approach of the movable plates independently of the direction of rotation of the endless transmission belts.

5. The relay pulley according to claim 3, wherein the facing bearing surfaces forming ramps are disposed partially within the thickness of the movable plates.

6. The relay pulley according to claim 1, wherein one of the movable plates has a hollow hub, coaxial to the hub of the relay pulley, to serve as a support for the other movable plate.

7. The relay pulley according to claim 3, wherein each inclined ramp has a slope ranging between 20–24 degrees.

8. The relay pulley according to claim 7, wherein each inclined ramp has a slope of about 22 degrees.

9. The relay pulley according to claim 1, wherein the hub of the relay pulley is displaceable in parallel to itself to obtain, in co-action with the movable member, a speed variation function.

10. The relay pulley according to claim 1, wherein the rotatable hub of the relay pulley and one of the movable plates of the member movable axially on said hub, are rendered solid in rotation by means of channels provided respectively within the external periphery of the hub and at the internal periphery of the centrally hollowed movable plate.

11. An endless power transmission with variable speed between a drive pulley, a relay pulley according to claim 1, and a driven pulley; wherein the relay pulley and the driven pulley are disposed in a transmission housing to form a monobloc assembly, the relay pulley being connected to said housing by a member for controlling the position of the hub of the relay pulley.

* * * * *